United States Patent [19]

Kleintjens

[11] Patent Number: 4,754,525
[45] Date of Patent: Jul. 5, 1988

[54] METHOD AND APPARATUS FOR DOSING PARTICULATE MATERIAL

[75] Inventor: Hendrik J. Kleintjens, Poortugaal, Netherlands

[73] Assignee: Thomas J. Lipton, Inc., Englewood Cliffs, N.J.

[21] Appl. No.: 918,343

[22] Filed: Oct. 14, 1986

[30] Foreign Application Priority Data

Oct. 11, 1985 [NL] Netherlands .......... 8502779

[51] Int. Cl.$^4$ .............................. A22C 7/00
[52] U.S. Cl. ............................. 17/45; 17/32
[58] Field of Search .................. 17/32, 45

[56] References Cited

U.S. PATENT DOCUMENTS

| | | | |
|---|---|---|---|
| 1,911,017 | 5/1933 | Garfunkel | 17/32 |
| 2,651,808 | 9/1953 | Burnett et al. | 17/32 X |
| 2,770,202 | 11/1956 | Garfunkel | 17/32 X |
| 3,433,647 | 3/1969 | Johnston | 17/32 X |
| 4,023,238 | 5/1977 | Phares | 17/41 |
| 4,106,160 | 8/1978 | Jentsch | 17/32 |
| 4,193,167 | 3/1980 | Orlowski et al. | 17/32 |
| 4,212,609 | 7/1980 | Fay | 17/32 X |
| 4,330,252 | 5/1982 | Bullock et al. | 17/32 X |

FOREIGN PATENT DOCUMENTS 10508 of 1910 United Kingdom .
724300 2/1955 United Kingdom .

Primary Examiner—Willie G. Abercrombie
Attorney, Agent, or Firm—Brumbaugh, Graves, Donohue & Raymond

[57] ABSTRACT

A method and an apparatus for dosing pieces of meat and suchlike particulate material, wherein the material to be dosed is compacted in a dosing chamber, only thereafter excess material is removed and finally the material is removed from the dosing chamber.

9 Claims, 2 Drawing Sheets

METHOD AND APPARATUS FOR DOSING PARTICULATE MATERIAL

BACKGROUND OF THE INVENTION

The invention relates to a method for dosing pieces of meat and similar deformable, particulate material by putting this material into a dosing chamber of predetermined capacity with an opening, removing excess material near that opening and thereafter removing the remaining material from said dosing chamber.

A known process for dosing deformable, particulate material utilizes apparatus comprising a rotatable table. In said table a plurality of openings are arranged, forming the upper openings of cylindrical dosing chambers arranged on the underside of the rotatable table. The bottom walls of the chambers are formed by a fixed bottom plate having one discharge opening. The bottom rims of the dosing chambers are slidingly movable on this plate when the table rotates, and once every revolution each bottom opening comes into register with the discharge opening. Alternatively, the chambers are provided with removable bottoms, which may be opened at the discharge station. For dosing different amounts of material, the capacity of the dosing chambers can be changed by adjusting the distance between the table and the bottom plate.

During the operation of this apparatus, the material to be dosed is put on the table, so that it falls into the dosing chambers. Excess material is removed from the opening by a scraper blade or a rotary brush means. Subsequently, the dosing chamber, which is filled to its upper rim, is emptied upon passing across the discharge opening.

The dosing accuracy of this method and the apparatus used therefore is limited if pieces of meat or similar deformable, particulate material are to be handled, since the filling rate of the dosing chambers will not be constant. This is in particular true if the number of pieces required for filling each dosing chamber is relatively small, say under 15.

SUMMARY OF THE INVENTION

One object of the invention is improving this accuracy. The present invention provides to that end an improved method and apparatus which are characterized in that the material in the dosing chamber is compacted prior to the removal of excess material.

Preferably, this compacting is done by filling the chamber while it has a capacity in excess of the predetermined capacity, and then reducing the capacity to the predetermined volume while an obstruction for material squeezed out of the chamber is arranged near to the opening.

In a preferred embodiment, the opening of the dosing chamber is partly closed during the reduction of the capacity of the chamber. The extent of closure of said opening may be adapted to the kind of product to be dosed. This may be done easily by using a spring-loaded means, which may be set to adapt the compression to the material to be dosed.

Optimum results are obtained if the capacity of the chamber is reduced from the side opposite the opening, and in particular in an upward direction.

The apparatus according to the invention comprises at least one dosing chamber which has at least at its upper side an opening and which may be closed at its bottom end, means for putting material to be dosed into the chamber, means for removing excess material near that opening of said chamber and means for removing material from said chamber. Typical apparatuses of this kind may be improved, as disclosed herein by providing the dosing chamber with variable capacity and a means for partly closing the opening of said chamber.

In one embodiment of the apparatus of the invention, the dosing chamber is provided with a bottom which can be changed in height during the dosing. Very simply, the capacity may be changed by employing a bottom formed as a piston movable in a cylindrical dosing chamber.

Preferably, the piston is provided with control means for moving the piston between a position in which the capacity of the chamber is a predetermined capacity and a position in which the capacity is in excess thereof.

Suitably, the control means are adapted for cyclically displacing the piston such that the chamber has a capacity in excess of the predetermined one, thereafter a capacity equalling the predetermined one, then a capacity equal to zero, and subsequently the excess capacity again. In this manner the material is reliably removed from the chamber and dosing errors due to sticky material are prevented.

If the dosing chamber is rotatably mounted about an axis, a cam disc can be arranged about the same axis, which disc forms part of the control means for displacing the piston in the dosing chamber.

The usual dosing apparatus of the type described initially may be modified to conform to the invention by providing an at least partly slanting surface forming the bottom of the dosing chamber. The under side of the dosing chamber is movable relative to the slanting surfaces and, has a variable capacity in that it is telescopically extendable and retractable. By substituting a suitably curved bottom for the usual flat one, using telescopic dosing chambers and arranging means for partly closing the upper opening of the chamber, the disadvantage of the usual dosing apparatus can be removed.

BRIEF DESCRIPTION OF THE FIGURES

The invention will be explained in the following description of some embodiments which are schematically shown in the drawings.

DETAILED DESCRIPTION OF THE INVENTION

Figure 1:
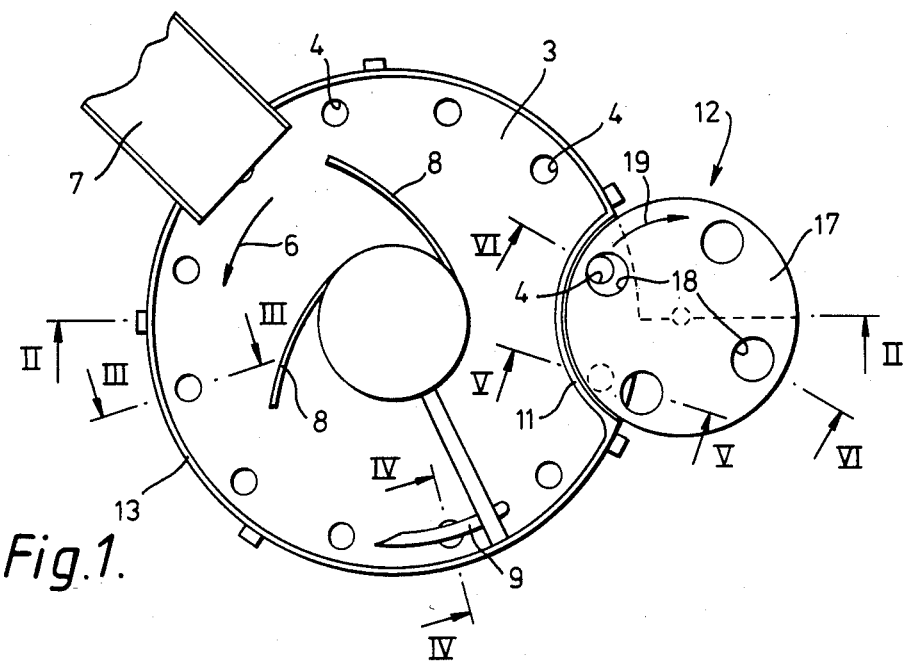
FIG. 1 shows a plan view of a preferred embodiment of the dosing apparatus according to the invention.
Figure 2:
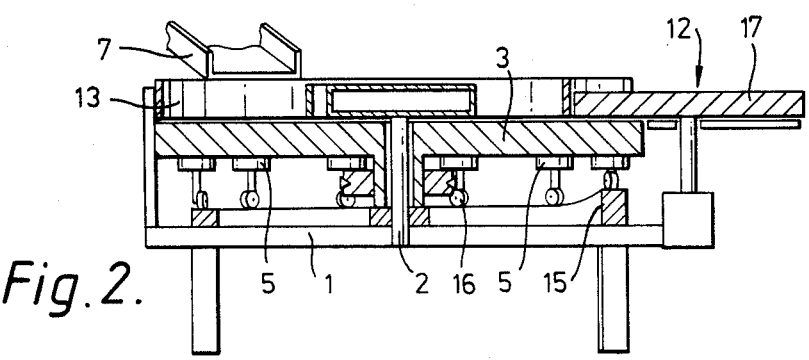
FIG. 2 shows the apparatus of FIG. 1 in vertical cross-section.

In FIGS. 1 and 2 a preferred embodiment of the dosing apparatus according to the invention is shown in plan view and in vertical cross-section, respectively.

A driven horizontal table 3 is rotatably arranged about an axle 2 which is supported in a frame 1. The table 3 is provided with a plurality of bores 4, forming the upper openings of cylindrical dosing chambers 5, which are all at the same distance from the axle. At the upper side of the table 3, several parts are arranged in the direction of rotation indicated by the arrow 6: a feeding trough 7 for the product to be dosed; guiding plates 8 for forcing the product outwardly on the table; an oblong obstructing means 9 which is arranged close over the path of travel of the bores 4, which has a more or less pointed nose in the direction against the rotation and which is movable in a vertical direction against the settable load of a spring 10; a scraper blade 11 formed by a radially inwardly directed, fixed, vertical strip, the under rim of which is in close proximity to the table and a discharge device 12.

Along the outer periphery of the table, a vertical strip 13 is arranged, preventing the material to be dosed from falling off the table.

Figure 3:
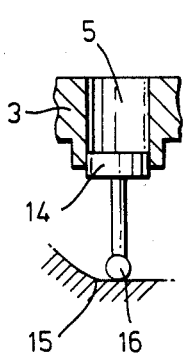
FIG. 3 shows a detail in section taken along the line III—III in FIG. 1.

The apparatus works in the following manner:

Material to be dosed is fed through the trough 7 onto the table 3 and forced towards the bores 4 by the guiding plates 8, so that it will fall into the chambers during the rotation of the table. The material should be in excess. First the situation as shown in FIG. 3 is met: A piston 14, which is movable in the dosing chamber 5, is kept in its lowermost position by a follower 16, running in a curve track 15 which is static and arranged around the axle 2.

Figure 4:
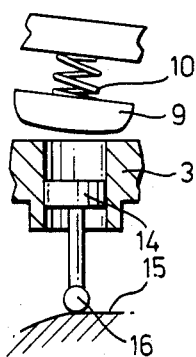
FIG. 4 shows a detail in section taken along the line IV—IV in FIG. 1.

After movement of the table to the position as shown in FIG. 4, the material in the chamber is exposed to a gradually increasing pressure by the upwardly moving piston 14 and the obstructing means 9 which is now over the opening of the chamber. The piston 14 is moved upwardly by the height increase of the curve track 15 until the dosing chamber has the predetermined capacity. Any excess material is squeezed out alongside and underneath the obstructing means owing to the partial closing of the opening and the spring-loaded arrangement of the obstructing means.

Figure 5:
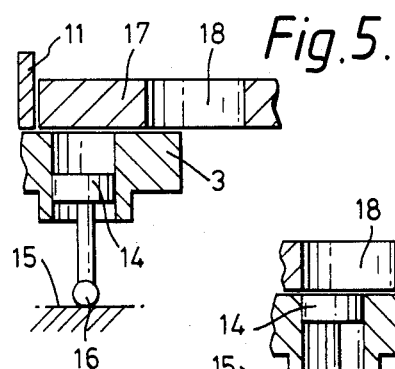
FIG. 5 shows a detail in section taken along the line V—V in FIG. 1.

Further movement does not change the position of the piston in the chamber. The bore 4 means underneath the scraper blade 11, which removes any excess material, so that the correct amount of material remains in the chamber, as shown in FIG. 5.

Figure 6:
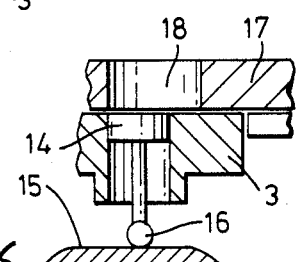
FIG. 6 shows a detail in section taken along the line VI—VI in FIG. 1.

This amount of material is removed from the chamber by moving the piston 14 to a position such that its upper surface is flush with the upper surface of the table 3, as shown in FIG. 6. This material is removed by a discharge means 12, comprising a horizontal disc 17 having cylindrical bores 18, which is lying against the table and is rotatable in a direction shown with the arrow 19. The separated amounts of material are separately expressed into subsequent bores 18 and removed, for instance to be dispensed into separate containers which are moving along.

Figure 7:
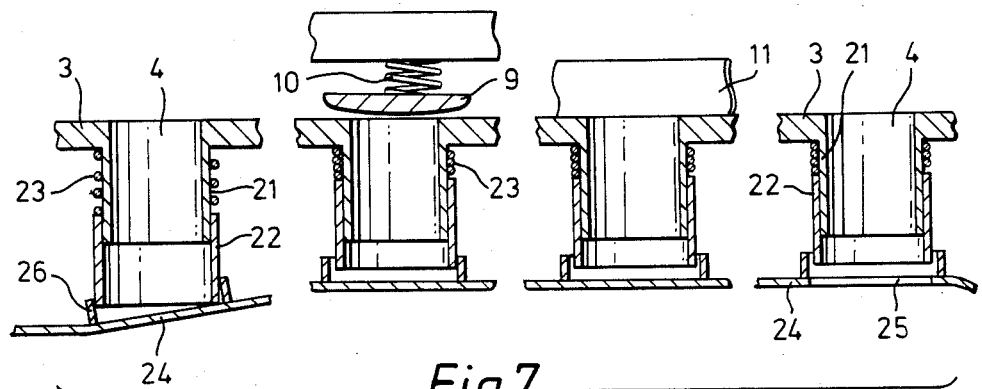
FIG. 7 is a partially developed view of a vertical section corresponding to FIGS. 3 to 6 through a second embodiment.

Another embodiment is shown in FIG. 7. The table 3 is provided with bores 4 again and cylindrical dosing chambers 20 are arranged underneath these bores. The chambers each are formed by two telescopically movable parts 21, 22, the wider and lower part 22 being urged downwardly by a spring 23 towards a bottom part 24. The seal between the lower part 22 and the bottom plate 24 being provided by a ring 26, which is pivotably connected to the lower part 22 by means of an axle extending in a radial direction with respect to the axis of rotation of the table 3.

The bottom plate 24 forms the bottom of the dosing chambers and shows in principle in a circumferential direction about the axle 2 a similar profile as the curve track 15 of the previous embodiment, so that the dosing chambers are changing their capacity in a similar manner. Compacting and removal of excess are effected in a manner as disclosed in connection with the previous embodiment. Discharging the separated material is effected differently in that the higher portion of the curve track 15 cannot be translated to a higher portion of the bottom plate 24. For discharging this material the bottom plate is provided with a discharge opening 25 through which the material is allowed to fall into suitable containers passing along, if required assisted by a jet of pressurized air.

Figure 8:
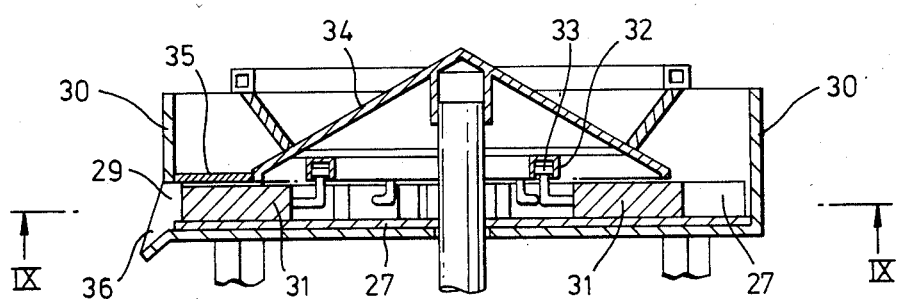
FIG. 8 shows a third embodiment in vertical section taken along the line VIII—VIII in FIG. 9.
Figure 9:
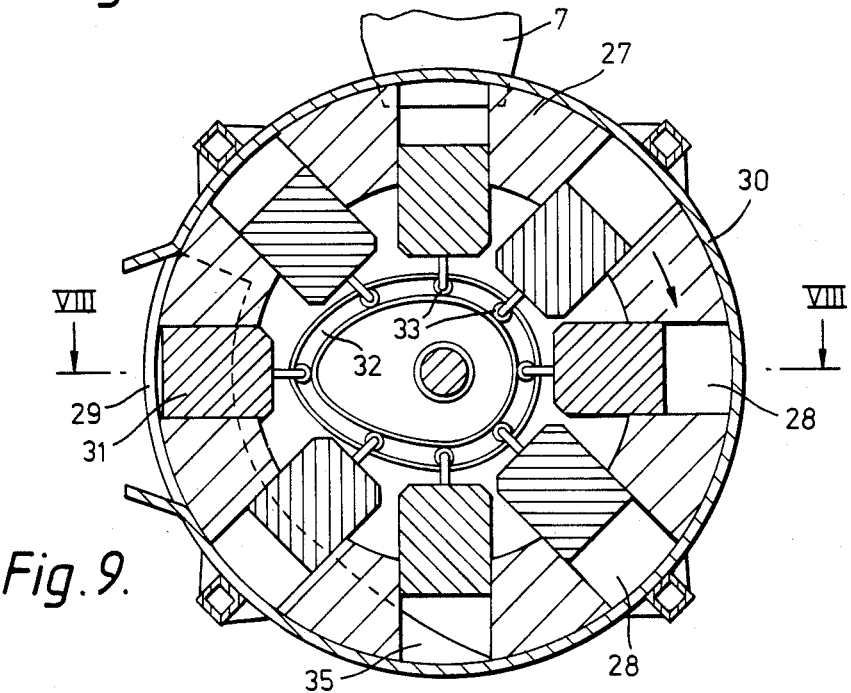
FIG. 9 shows that embodiment in horizontal section taken along the line IX—IX in FIG. 8.

A second alternative embodiment of the invented apparatus is shown in FIG. 8 and 9. A disc shaped rotor 27 having a peripheral ring of increased thickness is provided with radial chambers 28 of rectangular cross-section. The chambers are open at the inner and the outer periphery and at the upper side. The rotor is rotatable in a mantle 30 enclosing the rotor at its outer periphery, except for a discharge opening 29. Pistons 31 are movably arranged in the chambers and the movement thereof is controlled by followers 33 running in a curve track 32.

The opening within the peripheral ring is covered by a shallow conical cap 34 which is supported in a frame of the apparatus. Ahead of the spot where the pistons begin to move outwardly, a covering plate 35 gradually extends more inwardly over the open upper sides of the chambers 28. When the pistons 31 are moving outwardly, the product present in the chamber is obstructed in its upward movement during its compression. The foremost rim of this covering plate 35 is provided with an upstanding strip forming a scraper blade. When the forward end of the piston meets the scraper blade, the piston will not move further outwardly until the discharge opening 29 in the mantle 30 is reached. Then the piston 31 moves fully outwardly and discharges the product from the chamber 28 through the opening 29 on to a discharge channel 36.

Thereafter the piston moves entirely inwardly, so that the chamber can be filled with product again, since the covering plate 35 terminates beyond the opening 29. After the chamber is filled with loose product, the process repeats.

What I claim is:

1. A method for dosing a selected volume of a deformable, particulate material, comprising:
    (a) filling a dosing chamber having a volume greater than the selected volume with the particulate material;
    (b) reducing the capacity of the filled dosing chamber to the selected volume such that the particulate material is compacted within the dosing chamber and such that any excess particulate material is squeezed out through an opening in the dosing chamber;
    (c) removing the excess particulate material; and
    (d) removing the compacted particulate material from the dosing chamber.

2. A method according to claim 1, wherein the capacity is reduced by moving the bottom of the dosing chamber in an upward direction.

3. A method according to claim 1, further comprising the step of placing an obstruction over the opening prior to reducing the capacity of the filled dosing chamber.

4. A method according to claim 3, wherein the opening is partly closed during the reduction of the capacity of the chamber.

5. An apparatus for dosing a selected volume of a deformable particulate material, comprising:
   (a) a dosing chamber having a capacity variable between a first volume greater than said selected volume and a second volume equal to said selected volume during operation of the apparatus and having at least one opening for introduction and removal of material;
   (b) means for introducing particulate material into the dosing chamber;
   (c) means for at least partially closing the opening in said dosing chamber such that when the capacity of the dosing chamber is reduced, particulate material within the dosing chamber is compacted and any excess particulate material is squeezed out of the dosing chamber leaving the desired volume of compacted particulate material remaining in the dosing chamber;
   (d) means for removing excess material squeezed out of the dosing chamber; and
   (e) means for removing the remaining compacted particulate material from the dosing chamber.

6. A dosing apparatus according to claim 5, wherein the dosing chamber comprises a substantially cylindrical wall member and a bottom member which is axially moveable within the wall member to vary the capacity of the dosing chamber between said first and second volumes.

7. A dosing apparatus according to claim 6, wherein the bottom member is further moveable to reduce the capacity of the dosing chamber to a volume smaller than the selected volume such that the remaining compacted particulate material is pushed out of the dosing chamber.

8. A dosing apparatus according to claim 7, wherein the means for at least partially closing the opening is spring-loaded to adapt the compression to the material to be dosed.

9. A dosing apparatus according to claim 8, wherein the dosing chamber is rotatably arranged about an axis, about which axis is also arranged a cam disc, which forms part of the control means for moving the bottom member in the dosing chamber.

* * * * *